(12) United States Patent
Roth et al.

(10) Patent No.: US 6,233,913 B1
(45) Date of Patent: May 22, 2001

(54) COVERING DISPENSER FOR A ROUND BALER

(75) Inventors: Arsene Roth, Grays (FR); Ralf Evelgünne, Emsdetten (DE); Peter Guthmann, Metz (FR)

(73) Assignee: Usines Claas France, Woippy (FR)

(*) Notice: Subject to any disclaimer, the term of this patent is extended or adjusted under 35 U.S.C. 154(b) by 0 days.

(21) Appl. No.: 09/314,253

(22) Filed: May 18, 1999

(30) Foreign Application Priority Data

May 19, 1998 (DE) .............................................. 198 22 359

(51) Int. Cl.⁷ .................................................... A01D 75/00
(52) U.S. Cl. ................................................. 56/341; 100/88
(58) Field of Search ........................... 56/341, 344, 343; 100/88, 89; 403/220, 225, 226; 242/564.1, 564.2

(56) References Cited

U.S. PATENT DOCUMENTS

| | | | |
|---|---|---|---|
| 2,873,927 | * 2/1959 | McDonald | 242/564.1 |
| 2,930,664 | * 3/1960 | Liebisch | 242/564.2 |
| 4,366,665 | * 1/1983 | VanGinhoven et al. | 56/341 |
| 4,768,431 | * 9/1988 | Merritt, III et al. | 100/88 |
| 4,779,526 | * 10/1988 | Frerich et al. | 56/341 |
| 5,433,059 | * 7/1995 | Kluver et al. | 53/399 |

FOREIGN PATENT DOCUMENTS 76 673   12/1893 (DE) .
195 17 385 A1   11/1996 (DE) .
710244 * 6/1954 (GB) ...................................... 403/220

OTHER PUBLICATIONS

Iredell, Robert; Elastic Rubber Cushion Springs for Torque Load Applications; Product Engineering; pp. 119–123, Mar. 1952.*

* cited by examiner

Primary Examiner—Thomas B. Will
Assistant Examiner—Nathan Mammen
(74) Attorney, Agent, or Firm—Husch & Eppenberger, LLC; Robert E. Muir; Kevin M. Kercher

(57) ABSTRACT

In a round baler for agricultural crops including a supply station for feeding-out a strip-like covering material for the fully wound round bale and a cutting device for severing the covering material, simple provision is desirable for pulling the new leading-edge of the strip of covering material away from the knife-edge after the cutting process. Drive shafts of the advancing roller and a detainable ratchet wheel are mutually coupled in rotatable manner by a resilient hub-shaft connection. The hub-shaft connection is constructed such that, when the ratchet wheel is detained, the advancing roller can still rotate through a small angle and thereby deform resilient drive elements in order to produce an extremely high tension in the strip. The restoring forces so created turn the advancing roller in a direction opposite to the direction of movement of the strip as soon as the strip is severed. The leading-edge of the strip is thereby pulled away from the knife-edge.

7 Claims, 5 Drawing Sheets

COVERING DISPENSER FOR A ROUND BALER

BACKGROUND OF THE INVENTION

The present invention relates generally to agricultural machinery and, more particularly, to improvements in balers for harvested crops.

Round balers for bailing agricultural crops have a bale chamber, which is bounded to the side by end-walls and peripherally by bale chamber belts or other drivable winding elements, a supply feed station for feeding-out, via guide rollers, a strip-like covering material for the fully wound round bale, a means controlled by the winding action operation for initiating the feed-out of the covering material, and a cutting device and braking device for controlling the tension of the covering material. The advancing pre-feed roller of said feed-initiating means is preferably coupled to a temporarily detainable blocking element of a blocking device by means of a hub-shaft connection.

In round balers of the aforesaid type, the advancing roller for pulling the covering material from its roll is stationary while the round bale is being formed. The controlled driving means for the advancing roller is switched on after the round bale has been fully wound. The end of the covering material is then transported to the round bale. The speed at which the covering material is moving will increase as the strip-like covering material begins to be carried along by the round bale. This is the reason why the drive means for the advancing roller is equipped with an overrunning clutch. The cutting device for the strip-like material is controlled by the winding action of the covering material. This may be accomplished by means of a counter, which gives a signal when a predetermined number of revolutions of the round bale has occurred following its take-up of the covering material. The signal activates the cutting device. It is necessary for the tension of the strip to be relatively high during the cutting process in order to obtain a clean cut wherein the covering material, which has a difficult-to-cut mesh-like structure, is fully separated from the roll. There should be no braking action during the initial feed-out period of the leading edge of the covering material. The strip should be under no tension or merely subjected to an extremely small amount of tension since only the moments of the rollers have to be overcome. However, in order to ensure that the winding is tight when the covering material is being wound around the round bale by the bale's own rotation, it is necessary for the strip to be adequately tensioned. In certain circumstances, this tension must be significantly increased during the cutting process. The braking devices can be constructed in various ways. Thus, the braking action may be controlled depending on the torque required for driving the advancing roller of the feed-initiating means. A braking device which operates directly on the roll of covering material is also known. Furthermore, it is known to provide a suitably constructed brake for effecting the braking of the strip of covering material, depending on the speed of the covering material.

It is known that to significantly increase the tension in the strip while the covering material is being cut, the advancing roller of the feed-initiating means can be coupled to the blocking element in a blocking device. This blocking element may, for example, be a ratchet wheel that rotates with the roller. Thus, the roller is temporarily halted so that the covering material is pulled over the stationary roller, thereby considerably increasing the tension in the strip.

Although this ensures precise cutting of the strip-like covering material, one cannot prevent the front portion of the severed covering material from adhering to the knife edge in the cutting device. In practice, this amounts to just a few threads. Nevertheless, this may prevent proper feeding of the freely floating leading-edge of the covering material to the round bale during the next winding process. The operation of the system may be impaired due to the improper location of the covering material in the transportation path bounded by the rollers or belts.

There is also the disadvantage that the adjoining components may be subjected to excess loading for a short time. This loading may be extremely high momentarily, when the blocking element comes to a halt.

An object of the present invention is to overcome one or more of the disadvantages described above.

Another object is to produce a simple arrangement for a round baler of the type described herein such that the covering material will hang down in a freely moveable manner after the cutting process.

SUMMARY OF THE INVENTION

In accordance with the present invention there is provided a round baler for agricultural crops including a bale chamber which is bounded to the side by endwalls and peripherally by drivable winding elements such as bale chamber belts; a supply station for holding a supply of a strip-like covering material for the fully wound round bale; advancing and guide rollers for feeding-out a strip of the covering material; feed-initiating means controlled by the winding action for initiating the feed-out of the covering material; a cutting device; a braking device for controlling the tension of the covering material; a blocking device including a temporarily detainable blocking element; a hub-shaft connection for coupling the advancing roller to the temporarily detainable blocking element; a resilient drive element included in at least one of the hub-shaft connection and the advancing roller; the resilient drive element being so constructed and arranged that at least the advancing roller is rotatable through a relatively small angle in the direction of movement of the covering material during temporary detention of the blocking element.

A salient feature is a hub-shaft connection for the blocking element or the appertaining roller, which includes at least one resilient drive element, enabling the roller to rotate through a relatively small angle in the direction of movement of the covering material during the temporary stoppage of the blocking element.

As long as the blocking element can freely rotate with the appertaining roller, then the resilient drive elements will only be deformed, if at all, by the torque being transferred. However, as soon as the rotation of the appertaining roller is checked by the detention of the blocking element, it can nevertheless still twist through a relatively small angle with respect to the blocking element. This is accomplished exclusively by virtue of the strip of covering material that has just been pulled off by the round bale. The tensional force effective on the covering material is removed as soon as the covering material is cut-off from its roll. Restoring forces are created by the deformation of the drive elements during the advancement of the covering material. These restoring forces ensure that the roller will be rotated back, in a direction opposite the movement of the covering material, immediately after the cutting process. This prevents the threads from adhering to the knife-edge in the cutting device. The leading edge of the covering material will then be moved forward along the prescribed path by the driven advancing roller during the next winding process. The drive elements have a damping effect due to the fact that the roller can rotate just a little further when the blocking element is detained. The extremely high momentary loads are thereby significantly reduced.

In a further embodiment, it is provided that the hub-shaft connection basically comprises a tubular section rigidly connected to the blocking element or to the appertaining roller, an inner body located within the tubular section and rigidly connected to the shaft, and one or more resilient drive elements which are inserted between the outer tubular section and the inner body, closing the spaces therebetween. A simple and compact construction is thereby achieved. In order to ensure that the desired torque is conveyed by a sufficient number of drive elements, it is advantageous if the outer tubular section has a square cross-section and if the outer surface of the inner body is in the form of a square, such that the outer surfaces of the inner body lie at an angle of 45 degrees relative to the inner surfaces of the square-shaped tubular section. As a result, four approximately triangular-section spaces are formed which can be closed by the insertion of the drive elements therein.

The drive elements may be constructed such that they will maintain their form, or will only be slightly deformed, when the roller or the blocking element is driven to move the covering material forward. The creation of the restoring forces is accomplished by the detention of the blocking element. It is advantageous for the diagonals of the square-shaped inner body to be slightly smaller than, or to be approximately equal in length to, the spacing between the parallel surfaces of the outer tubular section. Substantially closed spaces for the drive elements are thereby provided. It is also advantageous for the edges of the inner body to be broken. It is also advantageous if each drive element comprises a strand of elastically deformable material, consisting of rubber or a rubber-like synthetic material. This ensures that the spaces will be substantially filled and that the drive elements will have a relatively long lifetime.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
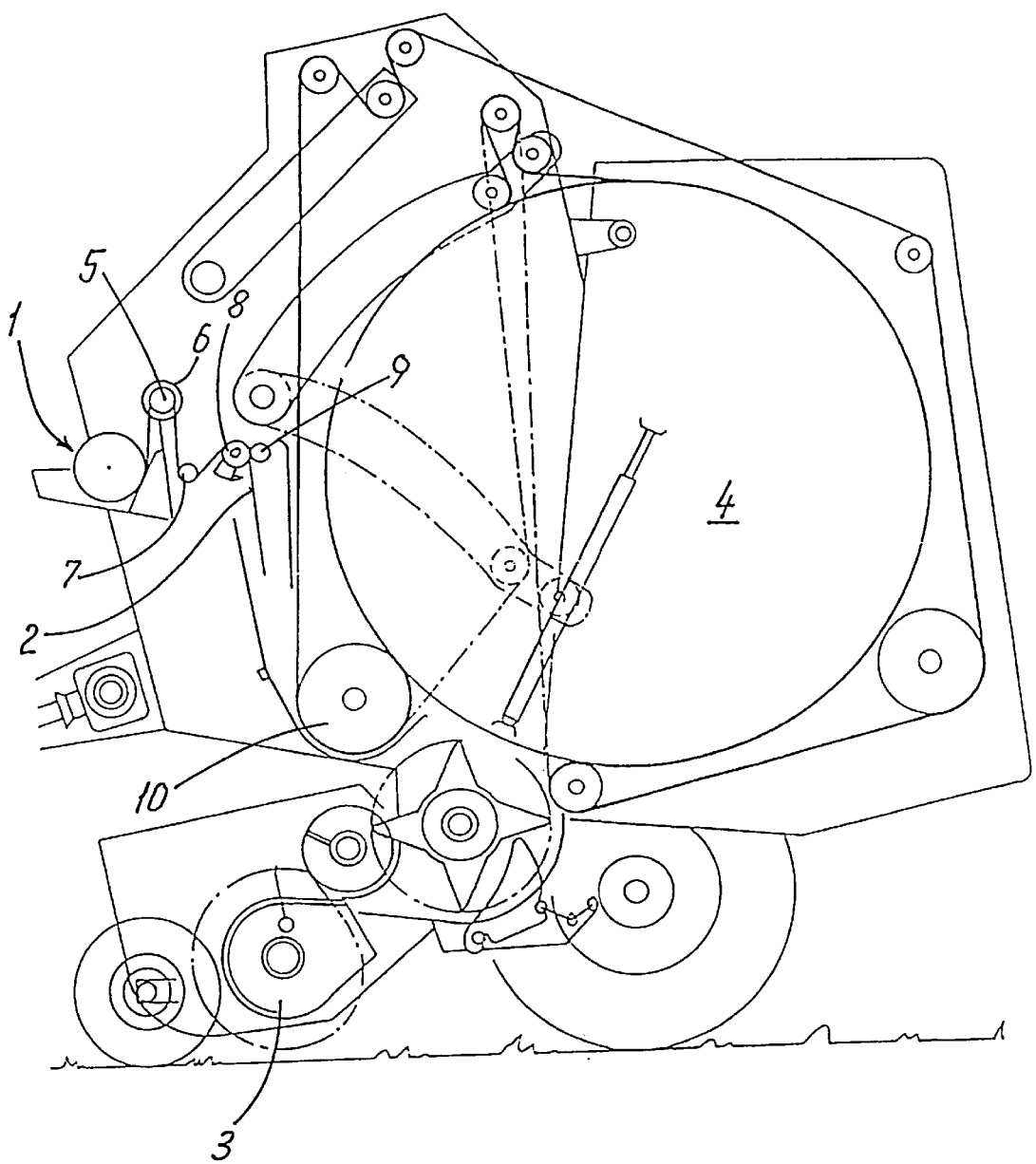
FIG. 1 is a schematic side view of a round baler embodying the invention.

A round baler is illustrated in FIG. 1 and is provided with a supply station 1 for feeding-out a strip 2 of netting-like covering material. The supply station is located to the front, as viewed in the forward direction of motion of the round baler, above the pick-up 3 and opposite the bale chamber 4. A freely rotatable guide roller 5 is mounted above the supply station 1. A braking device 6 which is associated with the roller 5 will not be described in detail. The strip 2 is then led over a further guide roller 7 to a driven advancing roller 8 which co-operates with a pressure roller 9. A non-illustrated drive means for the advancing roller 8 pullsout the strip 2 in order to feed it to the bale chamber 4, i.e. toward the round bale. The drive means is equipped with an overrunning clutch since the speed will increase when the strip begins to be carried along by the round bale. A cutting device is directly associated with the advancing roller 8. A belt roller 10 associated with the pick-up 3 forms the intake means for feeding the crop into the bale chamber 4. Once the binding process has been started by switching on the drive for the advancing roller 8, the leading edge of the strip 2 is fed via guide plates to an inlet slot formed by the belt roller 10 and an appropriately shaped section of the intake plate. The fully wound bale is then covered with three or four layers of the covering material which it automatically pulled over the bale. The number of layers is checked by a counter which is combined with the pressure roller 9 and produces a signal which starts the cutting device.

Figure 2:
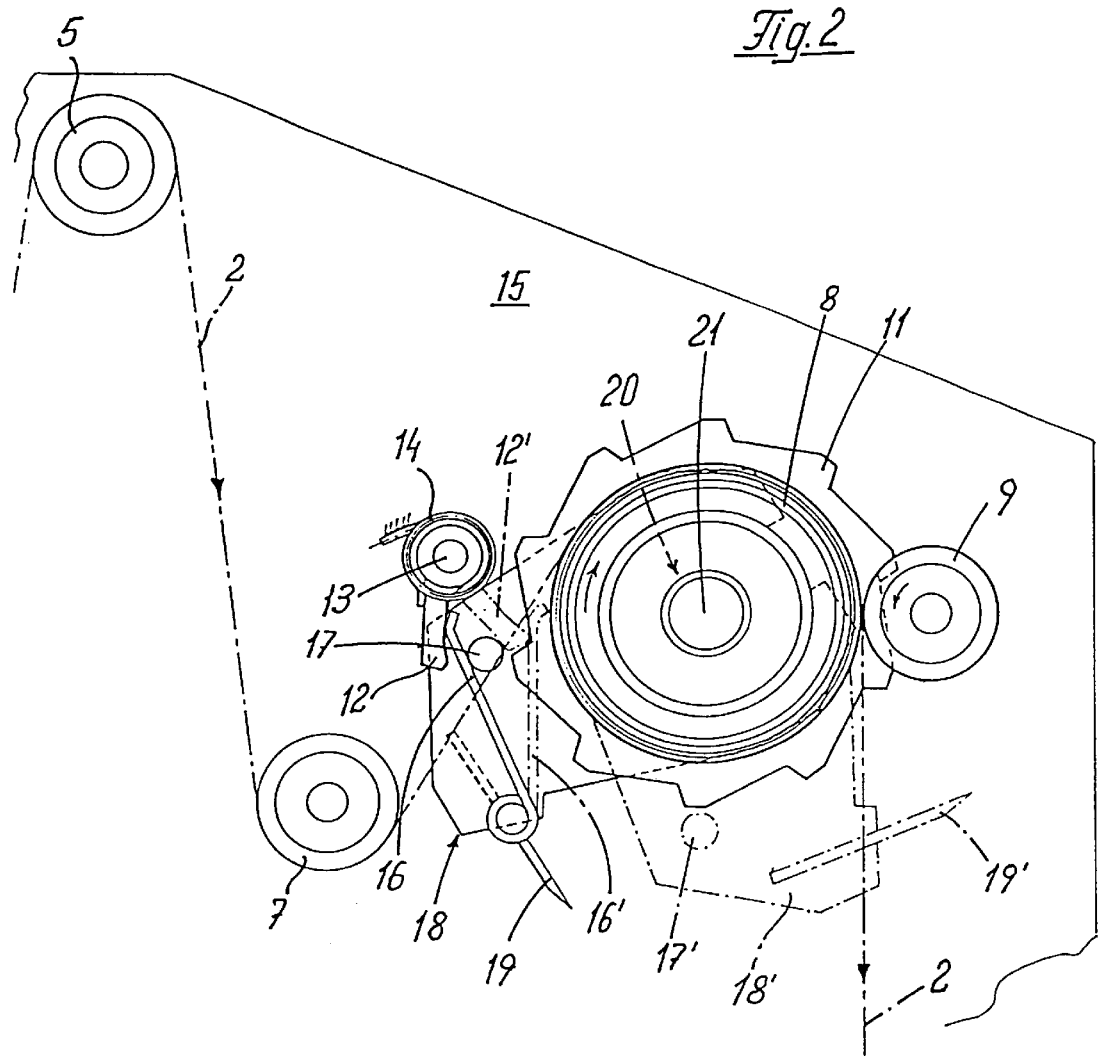
FIG. 2 is a detailed fragmentary side view of an advancing roller coupled to a blocking device.

The blocking device of FIG. 2 consists of a brake wheel in the form of a ratchet wheel 11 and a stop lever 12 that can be brought into engagement therewith. The stop lever is biased by a torsion spring 14 and is pivotal about an axis 13 which is parallel to the rotational axis of the advancing roller 8 or the ratchet wheel 11. Furthermore, the braking device 6 also includes a pivotal pawl 16 which is arranged on a fixed frame 15. The free end of the pawl abuts against a stop 17 when the ratchet wheel 11 is running freely. This stop 17 is arranged on the pivotal cutting device 18. In this embodiment, the cutting device 18 is pivotal about the rotational axis of the advancing roller 8 or the ratchet wheel 11.

As is apparent from FIG. 2, the knife-edge 19 is fed through the strip 2, thereby severing it when the cutting device 18 is started and moved. The moved position is shown in phantom lines in FIG. 2 and indicated by the reference numerals 19' and 18'. The stop 17 then pivots into position 17' so that the pawl 16 will move to position 16'. The stop lever 12 engages the ratchet wheel 11 as indicated by the reference 12'. The rotation of the advancing roller 8 is blocked in this position. This blocking effect is achieved before the knife-edge 18 enters the strip 2. The strip 2 is pulled over the advancing roller 8 by the rotating round bale, thus considerably increasing the tension in the strip 2. The strip 2 comes to an immediate stop when the stop lever 12 engages the ratchet wheel 11 and is thereafter severed by the knife-edge 19.

Figure 4:
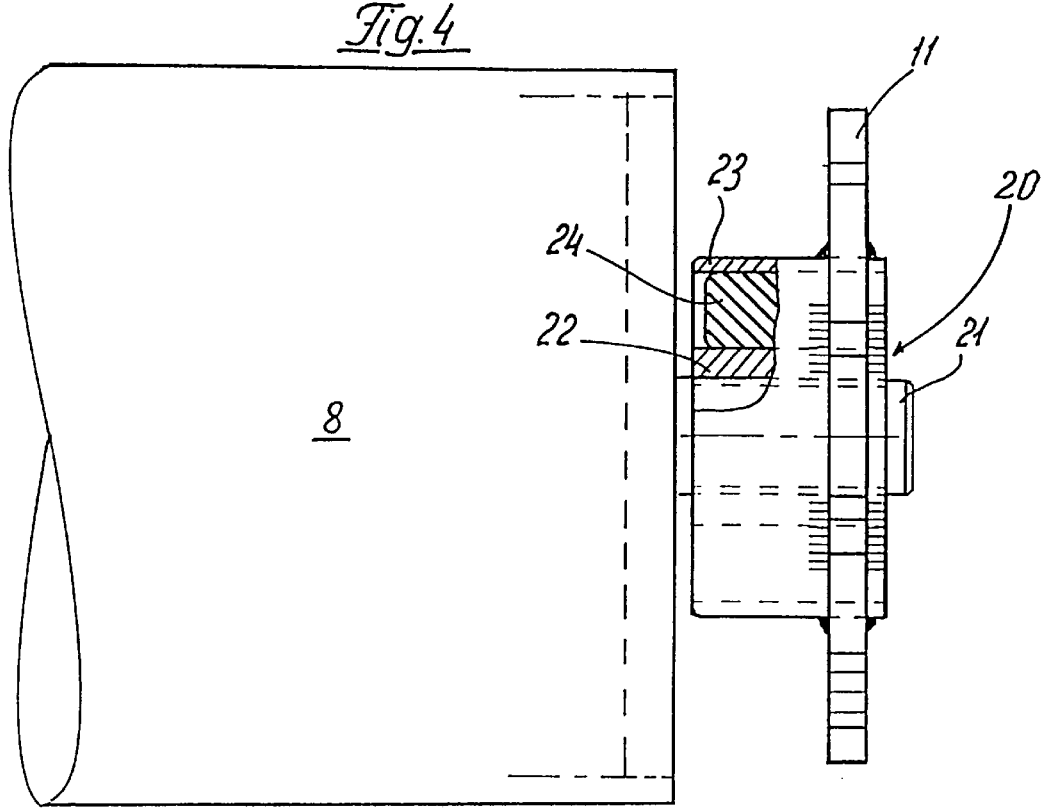
FIG. 4 is an elevational view of the hub-shaft connection of FIG. 3.
Figure 3:
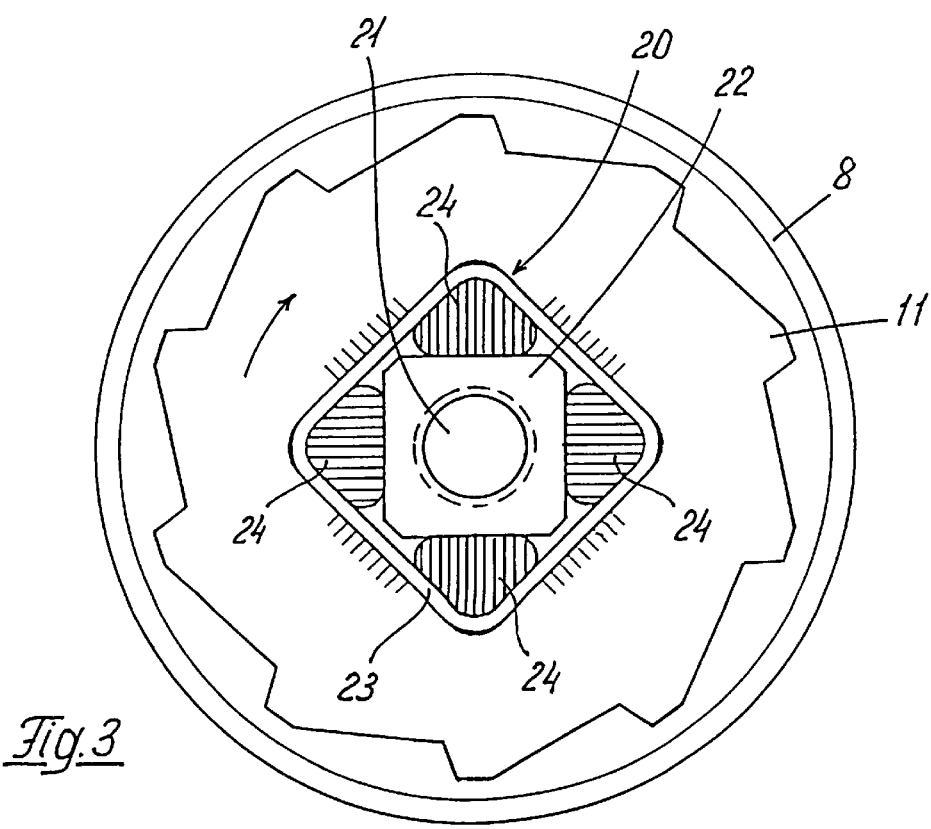
FIG. 3 is an end view of the hub-shaft connection for the round baler.
Figure 5:
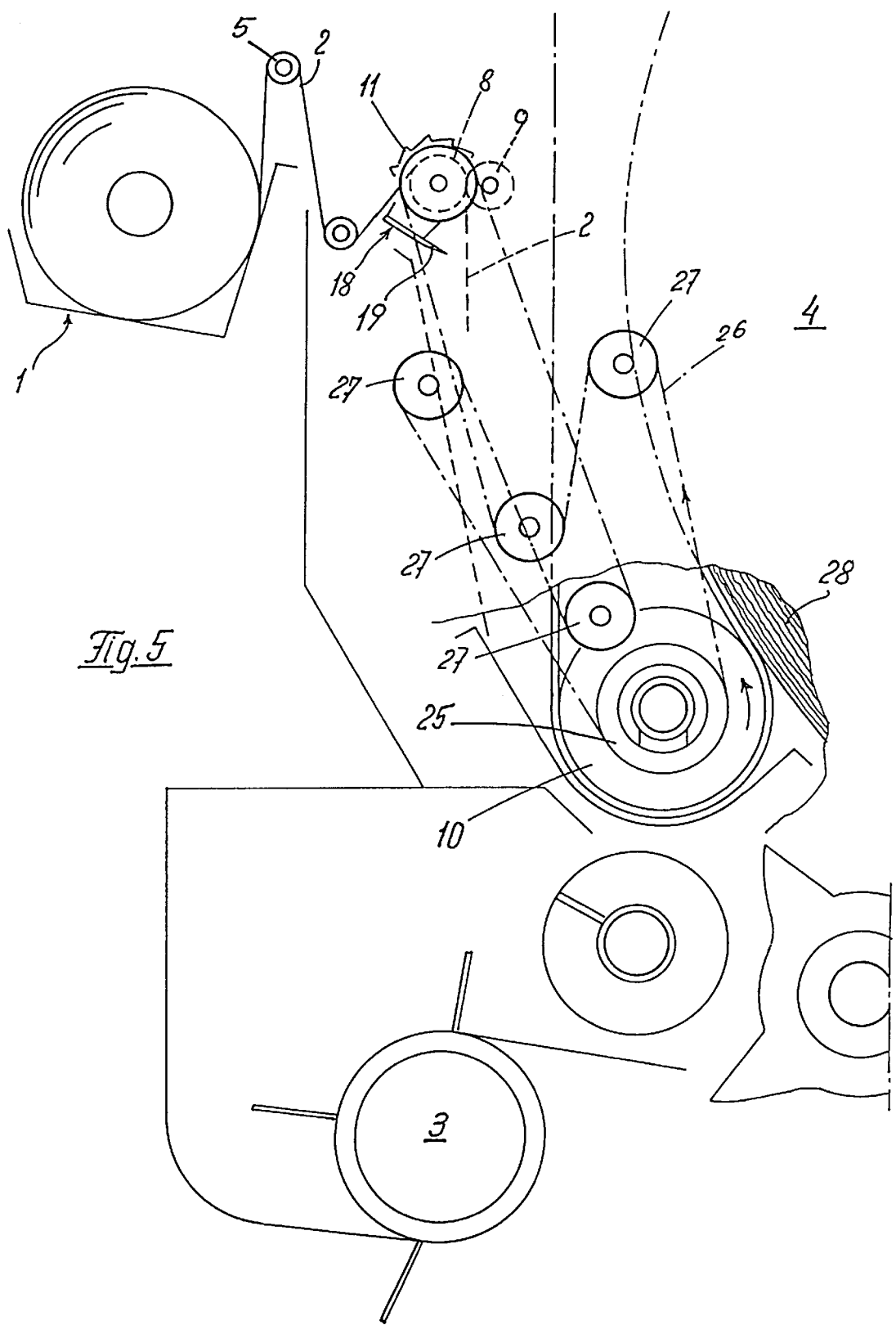
FIG. 5 is a detailed fragmentary side view of the round baler showing drive means for the advancing roller.

A preferred embodiment of the hub-shaft connection 20 for the round baler is illustrated in FIGS. 3 and 4. An inner body 22 is rigidly attached to a drive shaft 21 that can be rotated by a drive means equipped with an overrunning clutch, as illustrated in FIG. 5. The inner body 22 has a square-shaped peripheral surface having rounded edges. In the embodiment shown, the ratchet wheel 11 is provided with a square-shaped bore. A tubular section 23 having a square cross-section is rigidly secured in the square-shaped bore. The two diagonals of the inner body 22 are approximately as long as the spacing between two parallel faces of the tubular section 23.

The outer surfaces of the inner body 22 lie at an angle of 45 degrees relative to the inner surfaces of the tubular section 23. Approximately triangular spaces, which are filled by the insertion of strand-like drive elements 24 consisting of resilient material, are thereby formed between the outer surfaces of the inner body 22 and the inner surfaces of the tubular section 23.

In the illustrated embodiment, the hub-shaft connection 20 equipped with the resilient drive elements 24 is associated with the advancing roller 8. However, it could be functionally associated with other rollers of the roller system. The advancing roller 8 is rigidly attached to the shaft 21 in the illustrated embodiment. It would also be conceivable to provide a resilient coupling to the ratchet wheel 11.

It is apparent from FIGS. 3 and 4 that when the stop lever 12 engages the ratchet wheel 11, the advancing roller 8 will be rotated through a relatively small angle in the direction of motion of the strip 2. The resilient drive elements 24 are thereby deformed, thus creating the restoring forces. Due to the action of these restoring forces, as soon as the strip 2 has been severed by means of the pivotal cutting device 18, the advancing roller 8 will be rotated back, in a direction opposite to the direction of motion of the strip 2. As a result, the front, severed end of the strip 2 is pulled away from the knife-edge 19. Any possible adherence of individual threads of the covering material to the knife-edge 19 is thus effectively prevented. Moreover, the impulsive loads on the parts functionally associated with the ratchet wheel 11 are substantially reduced.

FIG. 5 shows that the cutting device 18 is pivotally mounted about the shaft 21 in this embodiment. Moreover, FIG. 5 also shows that a pulley 25 is rigidly attached to the shaft of the belt roller 10. The advancing roller 8 is driven by means of a belt 26 which is passed over four guide rollers 27.

Figure 6:
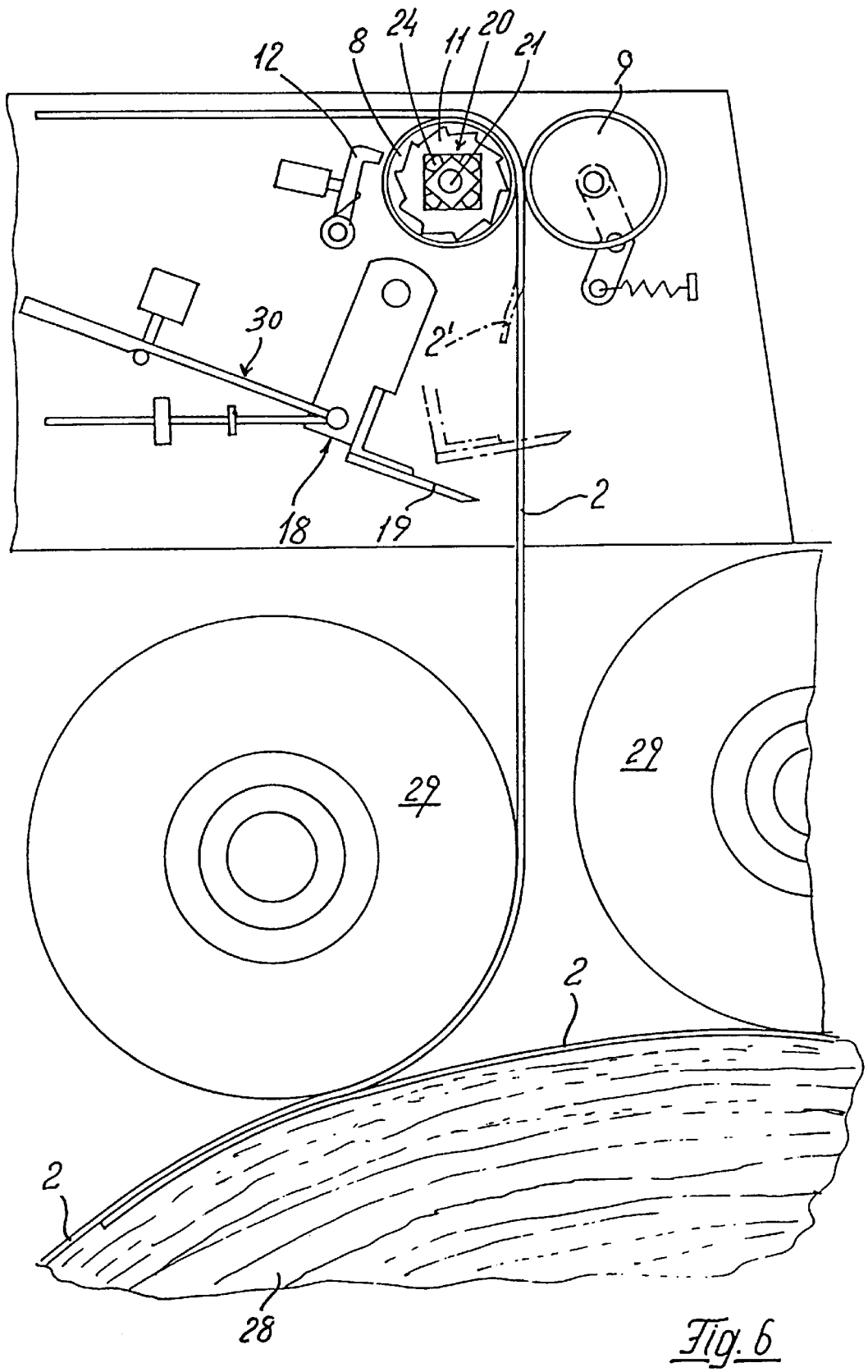
FIG. 6 is a side view of a cutting device for the round baler of FIG. 1 but modified vis a vis FIG. 2.

FIG. 6 illustrates how the covering material is wrapped several times around a fully wound round bale 28. When the non-illustrated drive means for the advancing roller 8 is switched on after the round bale 28 has been formed, the leading-edge of the strip 2 is moved vertically downwards and enters the gap between two drums 29 forming a boundary around the bale chamber 4. The end of the strip 2 is engaged between the round bale 28 and one of the drums 29, and the covering material is thereby carried along with the round bale 28 due to the rotation thereof. The strip 2 is held under tension by means of a braking device 6, which is not be described in detail, so that the covering material will be tightly wound around the round bale. The abrupt severance of the strip 2 occurs as soon as the pivotal drive means 30 for the cutting device 18 has been activated. However, the stop lever 12 is brought into engagement with the ratchet wheel 11 just prior to this cutting action. A very large increase in the tension of the strip 2 is thereby obtained.

The embodiment of FIG. 6 differs from the other embodiments in that the cutting device 18 is pivotal about an axis which is located below the shaft 21. Moreover, the stop lever 12 has an angular shape and is equipped with a servo unit. The end of the severed strip 2 is indicated by the phantom lines that are referenced 2'. FIG. 6 clearly shows that the end 2' is spaced from the knife-edge 19 after the strip 2 has been severed due to the rotation in the reverse direction of the advancing roller 8. Moreover, FIG. 6 shows that the pressure roller 9 is pressed against the advancing roller 8 by spring action.

The invention is not restricted to the embodiments illustrated. An important feature is that the advancing roller 8 or another roller associated with the ratchet wheel 11 rotates a bit further due to the resilient drive elements 24 when the ratchet wheel 11 itself is detained. Furthermore, following the severing of the strip 2, said roller will be rotated in the reverse direction by the restoring forces that have been created so that the free front end of the strip will be displaced away from the knife-edge 19.

Other objects, features and advantages will be apparent to those skilled in the art. While preferred embodiments of the present invention have been illustrated and described, this has been by way of illustration and the invention should not be limited except as required by the scope of the appended claims.

We claim:

1. A round baler for agricultural crops including a bale chamber which is bounded to the side by end-walls and peripherally by drivable winding elements; a supply station for holding a supply of a strip-like covering material for the fully wound round bale; advancing and guide rollers for feeding-out a strip of the covering material; feed-initiating means controlled by the winding action for initiating the feed-out of the covering material; a cutting device; a braking device for controlling the tension of the covering material; a blocking device including a temporarily detainable blocking element; a hub-shaft connection for coupling the advancing roller to the temporarily detainable blocking element; a resilient drive element included in at least one of the hub-shaft connection and the advancing roller; the resilient drive element being so constructed and arranged that at least the advancing roller is rotatable through a relatively small angle in the direction of movement of the covering material during temporary detention of the blocking element for cutting the strip of covering material with the cutting device and then the advancing roller is rotated in the reverse direction due to restoring forces of the resilient drive element to displace the strip of covering material from the cutting device.

2. A round baler in accordance with claim 1, wherein the hub-shaft connection comprises a tubular section rigidly connected to the blocking element, and an inner body located within the tubular section and rigidly connected to the shaft; and wherein the resilient drive element is located between the outer tubular section and the inner body.

3. A round baler in accordance with claim 2, wherein the outer tubular section has a generally square cross-section and the outer surface of the inner body is in the form of a square and the outer surfaces of the inner body lie at an angle of 45 degrees relative to the inner surfaces of the square-shaped tubular section.

4. A round baler in accordance with claim 3, wherein the diagonals of the square-shaped inner body are smaller than the spacing between the parallel surfaces of the outer tubular section.

5. A round baler in accordance with claim 1, wherein each resilient drive element comprises a strand of elastically deformable material.

6. A round baler in accordance with claim 1, wherein the advancing roller has a rotational axis, and including a tilting device for pivoting the cutting device about an axis located below and off-set from the rotational axis of the advancing roller.

7. A round baler in accordance with claim 1, wherein the hub-shaft connection comprises a tubular section rigidly connected to the blocking element, and a smaller inner body located within the tubular section and rigidly connected to the shaft; and wherein the resilient drive element includes a plurality of elastomeric members located between the outer tubular section and the inner body to provide the resilient drive.

* * * * *